United States Patent
Thoreson et al.

(10) Patent No.: US 10,478,876 B2
(45) Date of Patent: Nov. 19, 2019

(54) METHOD OF INCREASING HYDROPHOBICITY OF NATIVE WATER-BEARING ZONES

(71) Applicant: REGENESIS BIOREMEDIATION PRODUCTS, San Clemente, CA (US)

(72) Inventors: Kristen A. Thoreson, Irvine, CA (US); Jeremy Birnstingl, Bath (GB); Scott B. Wilson, Carlsbad, CA (US)

(73) Assignee: REGENESIS BIOREMEDIATION PRODUCTS, San Clemente, CA (US)

( * ) Notice: Subject to any disclaimer, the term of this patent is extended or adjusted under 35 U.S.C. 154(b) by 215 days.

(21) Appl. No.: 15/620,544

(22) Filed: Jun. 12, 2017

(65) Prior Publication Data

US 2017/0355000 A1 Dec. 14, 2017

Related U.S. Application Data

(60) Provisional application No. 62/349,554, filed on Jun. 13, 2016.

(51) Int. Cl.
*B09C 1/00* (2006.01)
*B09C 1/08* (2006.01)
(Continued)

(52) U.S. Cl.
CPC .............. *B09C 1/002* (2013.01); *B09C 1/08* (2013.01); *C02F 1/281* (2013.01); *C02F 1/283* (2013.01);
(Continued)

(58) Field of Classification Search
CPC ....... B09C 1/002; B09C 1/08; B09C 2101/00; C02F 1/28; C02F 1/281; C02F 1/283;
(Continued)

(56) References Cited

U.S. PATENT DOCUMENTS 2,509,777 A 5/1950 McMillan et al.
3,286,475 A 11/1966 Adams
(Continued)

FOREIGN PATENT DOCUMENTS

WO 9849106 11/1998
WO WO2015123569 8/2015

OTHER PUBLICATIONS

Mackenzie et al., "Carbo-Iron an Fe/AC composite as alternative to nano-iron for groundwater treatment", Water Res.; Aug. 2012, vol. 46 (12); pp. 3817-3826; (retrieved from Internet: (http:www///.sciencedirect.com/science/article/pii/S0043135412002552#), pp. 38'9, col. 2. para 2; p. 3820, col. 1, para 4; p. 3822, col. 2, para 2-3; abstract.

(Continued)

*Primary Examiner* — Patrick J Orme
(74) *Attorney, Agent, or Firm* — Stetina Brunda Garred and Brucker

(57) ABSTRACT

Methods for increasing hydrophobicity of native water-bearing zones or aquifers comprising the step of permanently embedding non-degradable, solid colloidal materials formed to have a particulate size of less than 10 microns. Exemplary materials include activated carbon, zeolites and hydrophobically treated clays. The particulate colloidal materials are coated with an agent to facilitate their distribution, including anionic polymers, chelating agents or combinations thereof. The materials are applied preferably by low pressure injection and are particularly effective at containing the migration of hydrocarbon contaminants, typically present as a plume, for at least several decades.

7 Claims, 2 Drawing Sheets

(51) Int. Cl.
*C02F 1/28* (2006.01)
*C02F 101/32* (2006.01)
*C02F 101/36* (2006.01)
*C02F 101/30* (2006.01)
*C02F 103/06* (2006.01)

(52) U.S. Cl.
CPC .......... *C02F 1/288* (2013.01); *B09C 2101/00* (2013.01); *C02F 1/285* (2013.01); *C02F 2101/306* (2013.01); *C02F 2101/322* (2013.01); *C02F 2101/36* (2013.01); *C02F 2103/06* (2013.01)

(58) Field of Classification Search
CPC ...... C02F 1/285; C02F 1/288; C02F 2103/06; C02F 2101/306; C02F 2101/322; C02F 2101/36; B01J 20/10; B01J 20/26
See application file for complete search history.

(56) References Cited

U.S. PATENT DOCUMENTS

| | | | |
|---|---|---|---|
| 3,785,852 | A | 1/1974 | Schleidt |
| 4,033,894 | A | 7/1977 | McLaughlin et al. |
| 4,168,924 | A | 9/1979 | Draper et al. |
| 4,211,822 | A | 7/1980 | Kurfman et al. |
| 4,504,528 | A | 3/1985 | Zucker et al. |
| 4,664,809 | A | 5/1987 | Fenton et al. |
| 5,006,250 | A | 4/1991 | Roberts et al. |
| 5,217,616 | A | 6/1993 | Sanyal et al. |
| 5,266,213 | A | 11/1993 | Gillham |
| 5,395,419 | A | 3/1995 | Farone et al. |
| 5,514,279 | A | 5/1996 | Blowes et al. |
| 5,580,770 | A | 12/1996 | DeFilippi |
| 5,591,118 | A | 1/1997 | Bierck |
| 6,592,294 | B1 | 7/2003 | Moore |
| 6,596,190 | B1 | 7/2003 | Igawa et al. |
| 6,806,078 | B2 | 10/2004 | Newman |
| 7,101,115 | B2 * | 9/2006 | Luthy .......... B09C 1/08 405/128.1 |
| 7,160,471 | B2 | 1/2007 | Looney et al. |
| 7,395,863 | B2 | 7/2008 | Wang et al. |
| 7,585,132 | B2 * | 9/2009 | Imbrie .......... B09C 1/002 210/747.7 |
| 7,845,883 | B1 | 12/2010 | Siler, III et al. |
| 7,963,720 | B2 | 6/2011 | Hoag et al. |
| 7,985,460 | B2 | 7/2011 | Polk |
| 8,748,331 | B2 | 6/2014 | Talley et al. |
| 8,986,545 | B2 | 3/2015 | Kolhatkar |
| 2003/0047507 | A1 | 3/2003 | Hou et al. |
| 2004/0031223 | A1 | 2/2004 | Durning et al. |
| 2004/0195182 | A1 | 10/2004 | Elliott |
| 2004/0249025 | A1 | 12/2004 | Dean |
| 2005/0077242 | A1 * | 4/2005 | Karlsson .......... B09C 1/002 210/638 |
| 2005/0263460 | A1 | 12/2005 | Farone et al. |
| 2005/0282390 | A1 | 12/2005 | Bian et al. |
| 2006/0054570 | A1 | 3/2006 | Block et al. |
| 2006/0088498 | A1 | 4/2006 | Martin et al. |
| 2006/0196850 | A1 | 9/2006 | Roh et al. |
| 2007/0297858 | A1 | 12/2007 | Imbrie |
| 2008/0008535 | A1 | 1/2008 | Ball |
| 2008/0125334 | A1 | 5/2008 | Burns et al. |
| 2008/0176943 | A1 | 7/2008 | Kaiser et al. |
| 2009/0197042 | A1 | 8/2009 | Polk |
| 2013/0058724 | A1 | 3/2013 | John et al. |
| 2015/0034559 | A1 | 2/2015 | Mork et al. |

OTHER PUBLICATIONS

Committee on Future Options for Management in the Nation's Subsurface Remediation Effort et al.; Prepublication of Alternatives for Managing the Nation's Complex Contaminated Groundwater Sites; 2012; 339 pages; National Academy of Sciences; The National Academies Press; Washington, D.C.; US.
Young, Lee W.; International Search Report; PCT/US 14/494,468; dated Aug. 2, 2013; 9 pages.
Copenheaver, Blaine R.; International Search Report; PCT/US2011/058388; dated Feb. 17, 2012; 6 pages.
Young, Lee W.; International Search Report; PCT/US 18/32145 ; dated Aug. 1, 2018; 10 pages.
Young, Lee W.; International Search Report; PCT/US 18/32392 ; dated Aug. 7, 2018; 10 pages.
Thomas, Shane; International Search Report; PCT/US17/22795; dated Jun. 9, 2017; 15 pages.
Copenheaver, Blaine R.; International Search Report; PCT/US2017/037242; dated Aug. 7, 2017; 13 pages.

* cited by examiner

METHOD OF INCREASING HYDROPHOBICITY OF NATIVE WATER-BEARING ZONES

CROSS-REFERENCE TO RELATED APPLICATIONS

The present United States non-provisional patent application claims benefit of U.S. Provisional Patent Application Ser. No. 62/348,554, entitled METHOD OF INCREASING HYDROPHOBICITY OF NATIVE WATER-BEARING ZONES, filed on Jun. 13, 2016, all of the teachings of which are included herein by reference.

STATEMENT RE: FEDERALLY SPONSORED RESEARCH/DEVELOPMENT

Not Applicable

BACKGROUND

The present invention relates generally to methods of permanently emplacing non-degradable, solid, colloidal materials into the subsurface in order to increase the retardation of a migrating contaminant plume, leading to improved plume management. More specifically, this invention relates to utilizing stabilized forms of colloidal sorbents that can be injected and distributed within the subsurface in order to engineer the effective hydrophobicity of the native aquifer and decrease the mobility of contaminant plumes.

Pollutant spills and releases that reach the subsurface, even in small quantities, can lead to extensive groundwater contamination. This contaminated water poses a serious human and ecological threat through various exposure pathways including coming in contact with potable groundwater supplies or by migrating under homes and businesses leading to vapor intrusion risks. Even if immediate contact with one of the exposure pathways does not occur, risk remains due the ability of the contaminant plume to migrate and expand, eventually coming into contact with a sensitive receptor.

Often times when contaminant plumes are identified, risk assessments will be performed to determine the action required to address the plume, which could range from active groundwater remediation to simply monitoring the natural attenuation of the plume. Fate and transport models are often used in the assessment to help to evaluate the human health or ecological threat. These models utilize the existing plume and aquifer characteristics including the contaminant concentration, the contaminant soil organic carbon-water partition constant (Koc), seepage velocity, natural biodegradation rates, the fraction of organic carbon (foc), and a calculated retardation factor to predict the extent of plume migration that can be expected over a certain time frame. In cases where plumes are found to be low-risk, a key aspect is often that the natural retardation provided by the native aquifer conditions for a given contaminant is large enough to prevent significant migration of the plume.

The amount of natural retardation that occurs within an aquifer varies directly with the levels of foc native to the aquifer as the foc provides the primary location for hydrophobic contaminants to partition and thereby prevent migration. This means that if the natural foc level is high enough in an aquifer, then a plume of a given contaminant of concern (COC) may be sufficiently retarded to effectively minimize the risk associated with migration. However, in many subsurface groundwater zones the foc is not substantial enough to increase the retardation and reduce the risk of a migrating contaminant plume. This can be especially true within the permeable channels of the subsurface that represent the primary zones of contaminant flux.

Exemplary prior art references reflecting the current state of technology includes the following publications, the teachings of each of which are expressly incorporated herein by reference:

Brown, M. J.; Burris, D. R. "Enhanced Organic Contaminant Sorption on Soil Treated with Cationic Surfactants. Groundwater 34(4), 1996, 734-744 (Brown).

Luthy, R.; Ghosh, U. U.S. Pat. No. 7,101,115 B2, 2006, "In situ stabilization of persistent hydrophobic organic contaminants in sediments using coal- and wood-derived carbon sorbents" (Luthy).

Mork, B.; Gravitt, J.; Ferguson, R.; Rittenhouse, S.; Thoreson, K. U.S. patent application Ser. No. 14/449,404, filed Aug. 1, 2014, "Colloidal agents for aquifer remediation" (Mork).

For example, a method for increasing the foc of an aquifer in the prior art is described by Brown where cationic surfactants that can be injected into the subsurface and adhere to the soil matrix are used in order to alter the native foc and increase the retardation of contaminants. While this does provide a temporary increase in the foc, this is not a long term solution as surfactants are degradable and therefore the increase in foc will not be permanent. This temporary increase is the limitation of any degradable substance that is capable of increasing the foc.

In another example, Luthy describes the use of activated carbon to reduce the flux of contaminants moving from the sediment to the water. While this method does provide a more permanent fix, it requires the activated carbon to be physically mixed into the aquifer (e.g. large auger mixing) or high pressure fracturing the subsurface which limits the widespread emplacement of the material, disrupts the natural flow channels of the aquifer, and can increase application costs.

Thus lacking in the art are methods for permanent contaminant containment using an agent that could be added to the subsurface as a means of increasing the retardation factor in a controlled method whereby the agent possesses the preferred characteristics that include: a solid material that can be permanently emplaced in the aquifer, a material that is not degradable and will last for a sufficiently long period of timed (i.e., decades) and is a material that has a high affinity for the contaminants of concern, especially hydrophobic contaminants. It would therefore be desirable to be able to add such an agent to the subsurface that provides the equivalent effect as increasing the foc in order to increase the retardation factor for COC plumes, especially in the primary or high flux zones. The ability to do this would result in improved management of plumes by preventing contaminants from migrating toward sensitive receptors and may sufficiently reduce the risk associated with these plumes to allow for environmental regulators to deem the plume-impacted sites fit for intended use. Additionally, it would be desirable to be able to emplace the desired solid material via injection under low (non-fracturing) pressures and have the material be in a form that is able to distribute widely in the aquifer under low injection pressures or natural groundwater flow conditions. In comparison to high pressure injection of agents or soil mixing, low pressure injections of a distributable reagent will reduce the emplacement costs, enhance the widespread distribution of the agent in the permeable channels to maximize effectiveness, and minimize the disturbance to the subsurface and the flux zones. An additional benefit of engineering the retardation factor of a migrating plume results in the ability to control the residence time of a contaminant within a reactive zone that promotes the biodegradation of biodegradable contaminants, thus further improving the ability to manage a contaminant plume.

SUMMARY OF THE INVENTION

The present invention specifically addresses and alleviates the above-identified deficiencies in the art. In this regard, the present invention is directed to methods for permanently increasing the hydrophobicity of an aquifer and thereby increasing the retardation factor of hydrophobic contaminants. This objective is accomplished by emplacing into an aquifer or the subsurface of a water-bearing zone a non-degradable, solid, colloidal material that has a high affinity for compounds contaminating an aquifer and that can readily distribute within the aquifer under low pressures. Following application, which may be accomplished by a variety of methods such as low pressure rejection, the colloidal material will permanently emplace on the surface of the soil or rock matrix in the aquifer in order to promote long-term retardation of contaminant plumes, typically by increasing the retardation factor by at least 50%, and more typically by one to three orders of magnitude over the native conditions.

The preferred solid, colloidal materials will possess a size of less than (<10 microns), have a high affinity for contaminants, and are stabilized with a surface coating, and optionally other amendments that allow the colloidal materials to effectively transport through soil and groundwater. Exemplary solid colloidal materials include activated carbon, zeolites, hydrophobically altered clays, and combinations thereof. With respect to various types of surface coatings can include anionic or nonionic polymers, chelating agents, or combinations of chelating agents with anionic or nonionic polymers. For example, colloidal activated carbon can be used in these methods that is formed to be preferably less than 10 microns in size, and more preferably 1-2 microns, and is stabilized in an aqueous solution with an anionic surface treatment such that the colloid can distribute through soil and groundwater upon injection, as disclosed, for example, in published United States Patent Application US 2015-0034559 A1, filed on Aug. 1, 2014, filed in the name of Mork et al., entitled COLLOIDAL AGENTS FOR AQUIFER REMEDIATION the teachings of which are expressly incorporated herein by reference. The colloid then permanently deposits on soil after distribution in the subsurface. Transport of these particles should range from at least 5 centimeters up to about 5 meters, depending on the characteristics of the subsurface water-bearing zone and volume injected.

The groundwater contaminants that are treated by this invention include any organic contaminants that sorb to activated carbon and other sorbents used in water purification. These include all petroleum hydrocarbons, e.g. gasoline, diesel, motor oil and their constituents, chlorinated solvents including trichloroethene, tetrachloroethene, dichloroethenes, vinyl chloride, chlorinated ethanes, chlorinated benzenes, and fluorinated compounds including perfluorooctane sulfonic acid and perfluorooctanoic acid. These groundwater contaminants are listed for example and are not meant to limit the scope of the invention.

Overall, this approach provides a cost effective process of engineering the retardation factor for a migrating contaminant plume to beyond a value that natural aquifer conditions can provide. The ability to readily increase the retardation of a plume by a factor of at least one to three orders of magnitude over natural conditions offers a plume management strategy that significantly decreases the risk of contaminated groundwater coming into contact with human exposure pathways.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
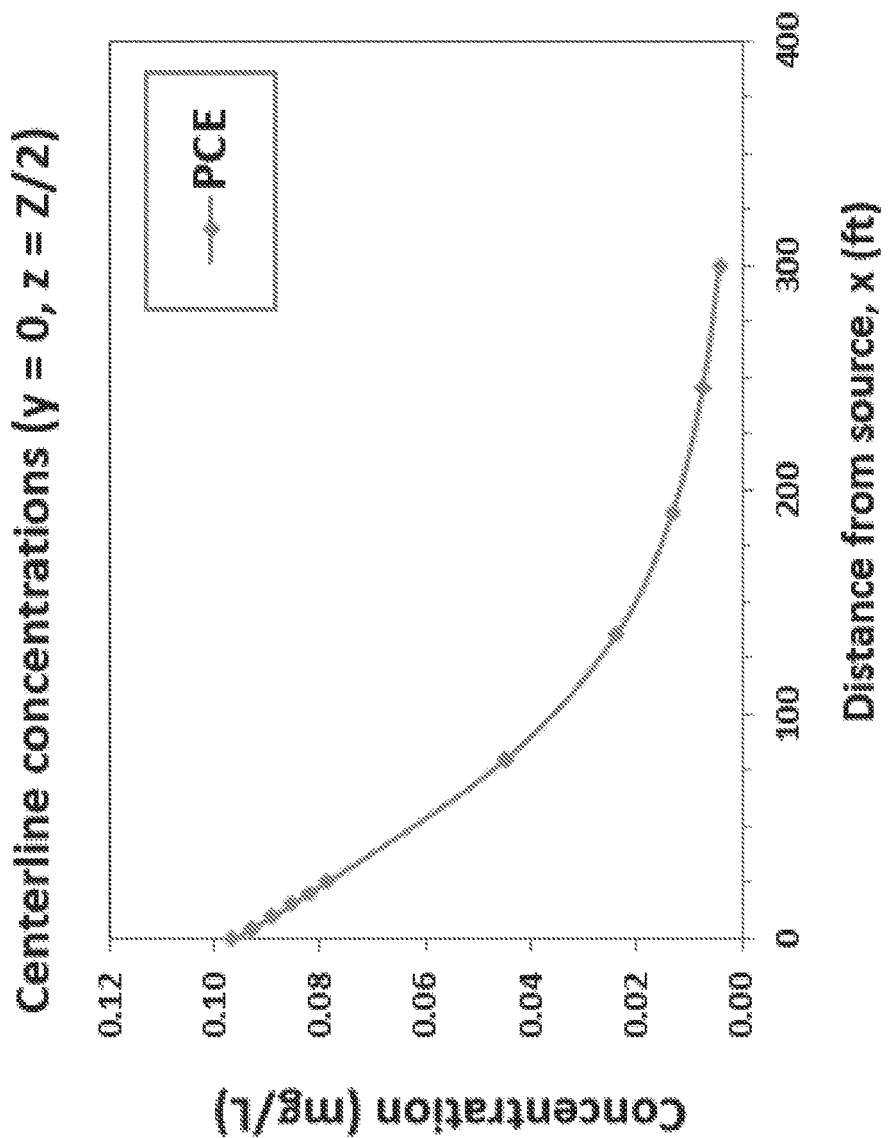
FIG. 1 illustrates a simulated plume centerline concentration for tetrachloroethylene (PCE) as a plume of PCE migrates over a 35 year period under native conditions.

The detailed description set forth below is intended as a description of the presently preferred embodiment of the invention, and is not intended to represent the only form in which the present invention may be implemented or performed. The description sets forth the functions and sequences of steps for practicing the invention. It is to be understood, however, that the same or equivalent functions and sequences may be accomplished by different embodiments and that they are also intended to be encompassed within the scope of the invention.

The present invention is directed to methods for permanently increasing the hydrophobicity of an aquifer in such a manner that consequently causes the retardation of the migration of hydrophobic contaminants present therein. The methods of the present invention thus advantageously facilitates the containment of such hydrophobic contaminants that would otherwise become widely dispersed within the aquifer and thus leading to more widespread contamination.

To achieve that end, the methods of the present invention deploy the use of a non-degradable, solid, colloidal material that has a high affinity for hydrophobic contaminants present in an aquifer that are further operative to be readily distributed within the aquifer under low pressure. Exemplary of such non-degradable, solid, colloidal materials include activated carbon, zeolites and hydrophobically altered clays, as well as combinations thereof, with activated carbon being a preferred material. According to a preferred embodiment, such non-degradable, solid, colloidal materials are formed to have a very fine particulate size, typically ranging from 0.1 to 10 microns, and preferably between 1-2 microns, that are further provided with surface treatment to thus enable the colloid material to distribute through soil and groundwater upon injection. To that end, such surface treatment may include treatment with an anionic or nonionic polymer, such as carboxymethyl cellulose (CMC), carrageenan, polyacrylic acid, xanthum gum, polyacrylates, polyacrylamides, co-polymers of acrylamide and acrylate, and combinations thereof Alternatively, the particulate surface of the solid, colloidal material may comprise one or more chelating agents, which can include but not limited to citrates, phosphates, silicates, borates, sulfates, carbonates, aminocarboxylic acids and salts thereof, polyamines, and combinations thereof. In further refinements of the invention, the particulate solid, colloidal materials may be treated with both anionic or nonionic polymers and one or more chelating agents as may be desired for a particular application and/or to enhance distribution of the solid, colloidal materials in a given aquifer or water-bearing zone.

By way of example, and not in any way limiting the scope of the present invention, such colloidal materials may take the form as those disclosed in published United States Patent Application US2015/0034559 A1 entitled COLLOIDAL AGENTS FOR AQUIFER REMEDIATION, filed by Mork, et al. on Aug. 1, 2014, the teachings of which are expressly incorporated herein by reference. Any such solid, colloidal materials, however, will in all cases have a high affinity for contaminants that are not only stabilized, such as through a surface coating or other amendments, but also allow the colloidal material to effectively transport through soil and groundwater.

In use, the colloidal material will be operatively distributed via injection within the aquifer under low pressure, non-fracturing pressure, defined as less than 100 psi. Application can likewise be accomplished via other techniques well-known in the art such as gravity feed or percolation. Ideally, the solid, colloidal materials as stabilized with a surface coating will be operative to migrate into position within the aquifer a distance ranging from at least 5 centimeters to up to 5 meters from the point of introduction, depending on the characteristics of the subsurface water-bearing zone and volume of solid, colloidal materials deployed at the site of introduction into the aquifer or water-bearing zone.

Following application, the non-degradable colloidal materials will subsequently become permanently embedded on the surface of the soil or rock matrix in the aquifer and thereafter promote long-term retardation of migrating contaminant plumes for periods lasting years to decades. Advantageously, such materials can typically increase the retardation of migration plume by at least 50% over the native aquifer conditions, and in some cases by a factor of 1 to 3 orders of magnitude over the native conditions of the aquifer. In any case, the desired retardation can be calculated and then the colloidal material can be dosed accordingly to meet the desired retardation factor.

As discussed above, the solid colloidal materials will have a high affinity for contaminants, and specifically hydrophobic contaminants. Such contaminants that may be effectively treated by the methods of the present invention can include any organic contaminants that sorb to activated carbon and other sorbents used in water purification. These include all petroleum hydrocarbons, e.g. gasoline, diesel, motor oil and their constituents, chlorinated solvents including trichloroethene, tetrachloroethene, dichloroethenes, vinyl chloride, chlorinated ethanes, chlorinated benzenes, fluorinated compounds including perfluorooctane sulfonic acid and perfluorooctanoic acid, pesticides, herbicides, organic compound-based agricultural fertilizers and combinations thereof. These groundwater contaminants are listed for example and are not meant to limit the scope of the invention.

By way of illustration, and by no means meant as limiting the present invention, the following example is provided:

Example 1

Example scenario describing the increased retardation of a PCE plume through the addition of colloidal activated carbon to the aquifer. In this example, a PCE plume was modeled using a modified version of the BIOCHLOR fate and transport software with the following plume parameters:

0.1 mg/L PCE
Model timeframe: 35 years
Seepage velocity: 100 ft/yr
foc: 0.0015
Biotransformation rate: 0.85 yr−1
Calculated retardation factor: 3

In this case the retardation factor is calculated based on the foc and the koc of PCE, and was determined to be a factor of 3. The same plume was then modeled with the addition of a colloidal activated carbon to the aquifer as follows:

Colloidal activated carbon application length: 25 feet
Colloidal activated carbon dose: 1000 mg/L
Calculated retardation factor: 394

Under these conditions, the retardation factor is calculated using the sum of native retardation factor and the factor calculated using the Freundlich isotherm parameters measured for PCE with the colloidal activated carbon. The resulting factor was determined to be 394, an increase of over two orders of magnitude over the native conditions. This is the equivalent of increasing the foc from 0.0015 to 0.3.

Figure 2:
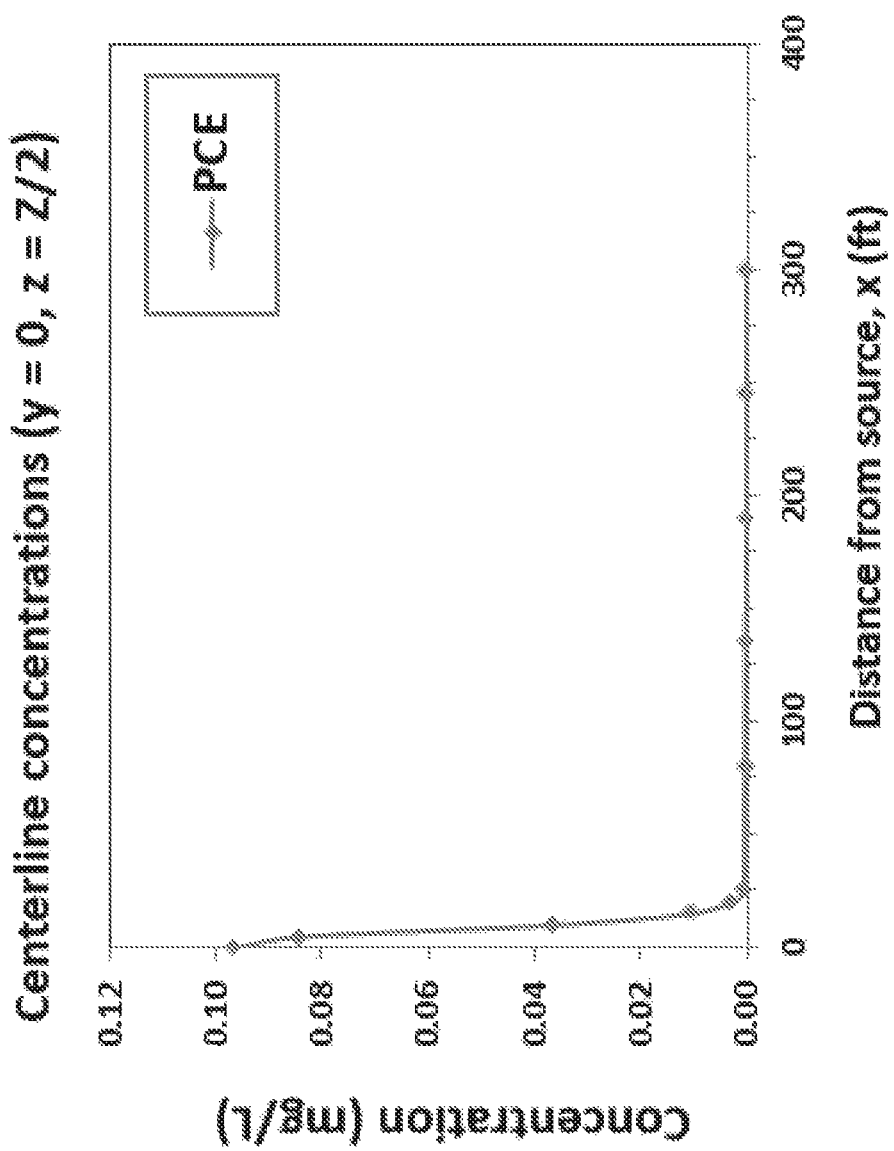
FIG. 2 illustrates the simulated plume centerline concentration for PCE as illustrated in FIG. 1 with the addition of a colloidal activated carbon treatment and how the same increased the retardation of the PCE plume and inhibited its migration.

Graphical outputs from the modeling study are shown in FIGS. 1 and 2. The model demonstrates that under the natural aquifer conditions, represented in FIG. 1, the PCE plume would extend over 300 ft. after 35 years. In comparison, when a 25 ft. colloidal activated carbon barrier was installed at a concentration of 1,000 mg/L, the retardation factor was increased from 3 to 394, and the plume was contained for the 35-year period, as shown in FIG. 2.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

What is claimed is:

1. A method for the retardation of the migration of hydrophobic contaminants through the subsurface of a water-bearing zone comprising the steps of:
    a) providing a non-degradable, solid, colloidal material to which said hydrophobic contaminants will sorb, said colloidal material having a particle size of less than 10 microns and having a surface treatment formed thereon to facilitate distribution of the colloid material through soil and groundwater;
    b) applying said colloidal material provided in step a) to the subsurface of said water-bearing zone by a method selected from the group consisting of injection within the subsurface of said water-bearing zone at a pressure of less than 100 psi, gravity feed and percolation such that once applied, said surface treatment is operative to facilitate distribution of said colloidal material into position within the subsurface of said water-bearing zone a distance up to 5 meters; and
    c) permanently embedding said colloidal material distributed within the subsurface of said water-bearing zone in step b) as facilitated by said surface treatment to sorb said hydrophobic contaminants passing therethrough for a period of at least 30 years.

2. The method of claim 1 wherein said non-degradable, solid, colloidal material is selected from the group consisting of activated carbon, zeolites, hydrophobically altered clays, and combinations thereof.

3. The method of claim 1 wherein said surface treatment is selected from the group consisting of carboxymethyl cellulose (CMC), carrageenan, polyacrylic acid, xanthum gum, polyacrylates, polyacrylamides, co-polymers of acrylamide and acrylate, and combinations thereof.

4. The method of claim 1 wherein said surface treatment comprises at least one chelating agent.

5. The method of claim 4 where said chelating agent is selected from the group consisting of citrates, phosphates, silicates, borates, sulfates, carbonates, aminocarboxylic acids and salts thereof, polyamines, and combinations thereof.

6. The method of claim 1 wherein said surface treatment comprises the combination of at least one chelating agent and either an anionic or nonionic polymer.

7. The method of claim 1 wherein said hydrophobic contaminants consist of gasoline, diesel, motor oil and their constituents, chlorinated solvents including trichloroethene, tetrachloroethene, dichloroethenes, vinyl chloride, chlorinated ethanes, chlorinated benzenes, fluorinated compounds including perfluorooctane sulfonic acid and perfluorooctanoic acid, pesticides, herbicides, organic compound-based agricultural fertilizers and combinations thereof.

\* \* \* \* \*